(12) United States Patent
Beuss et al.

(10) Patent No.: US 9,054,582 B2
(45) Date of Patent: Jun. 9, 2015

(54) LOAD CONTROL CIRCUIT IN A MOTOR VEHICLE CONTROL DEVICE

(75) Inventors: Jochen Beuss, Erzhausen (DE); Michael Kutzner, Sulzbach (DE); Tobias Unger, Bischofsheim (DE)

(73) Assignee: Continental Teves AG & Co. oHG (DE)

( * ) Notice: Subject to any disclaimer, the term of this patent is extended or adjusted under 35 U.S.C. 154(b) by 1353 days.

(21) Appl. No.: 12/863,687

(22) PCT Filed: Jan. 22, 2009

(86) PCT No.: PCT/EP2009/050693
§ 371 (c)(1),
(2), (4) Date: Oct. 7, 2010

(87) PCT Pub. No.: WO2009/092751
PCT Pub. Date: Jul. 30, 2009

(65) Prior Publication Data
US 2011/0037316 A1    Feb. 17, 2011

(30) Foreign Application Priority Data

Jan. 25, 2008    (DE) .................. 10 2008 006 253
Jan. 20, 2009    (DE) .................. 10 2009 005 265

(51) Int. Cl.
*B60L 1/00*    (2006.01)
*H02M 3/158*    (2006.01)
*B60L 7/00*    (2006.01)

(52) U.S. Cl.
CPC ............ *H02M 3/158* (2013.01); *B60L 2210/12* (2013.01); *Y02T 10/7233* (2013.01); *B60L 7/00* (2013.01)

(58) Field of Classification Search
CPC ... Y02T 10/7233; B60L 2210/12; B60L 7/00; H02M 3/158
USPC .......................................................... 307/9.1
See application file for complete search history.

(56) References Cited

U.S. PATENT DOCUMENTS

| | | |
|---|---|---|
| 5,680,300 A | 10/1997 | Szepesi et al. |
| 5,940,285 A | 8/1999 | Carrere et al. |
| 2002/0041502 A1* | 4/2002 | Ulinksi et al. .................. 363/37 |
| 2006/0103365 A1 | 5/2006 | Ben-Yaacov |
| 2008/0215200 A1* | 9/2008 | Toth ................................ 701/22 |

OTHER PUBLICATIONS

International Search Report dated Jan. 22, 2009, application No. PCT/EP2009/050693.

* cited by examiner

*Primary Examiner* — Daniel Cavallari
(74) *Attorney, Agent, or Firm* — RatnerPrestia

(57) ABSTRACT

A load control circuit includes one or more current regulators, in particular in an electronic motor vehicle control unit, wherein one or more preferably inductive load(s) is/are connected to a circuit located outside the control unit or inside the control unit, and wherein the load current flowing through the load(s) is or can be reduced by way of one or more step-down converters to a voltage potential below the supply voltage. A step-down converter includes a clocked DC/DC converter having at least one clocked switch and an energy storage medium, in particular a capacitor, for conversion, wherein the clock control of the switch or switches is modified according to the charge state of the energy storage medium and wherein the charge state is determined according to the voltage present at the energy storage medium.

12 Claims, 6 Drawing Sheets

LOAD CONTROL CIRCUIT IN A MOTOR VEHICLE CONTROL DEVICE

CROSS REFERENCE TO RELATED APPLICATIONS

This application is the U.S. national phase application of PCT International Application No. PCT/EP2009/050693, filed Jan. 22, 2009, which claims priority to German Patent Application No. 10 2008 006 253.7, filed Jan. 25, 2008 and German Patent Application No. 10 2009 005 265.8, filed Jan. 20, 2009, the contents of such applications being incorporated by reference herein.

FIELD OF THE INVENTION

The invention relates to a load actuation circuit having one or more current regulators, particularly in an electronic motor vehicle controller, wherein one or more preferably inductive load(s) is/are connected to the circuit, said load(s) being arranged outside the controller or inside the controller, characterized in that the load current flowing through the load(s) is lowered or can be lowered to a voltage potential below the supply voltage by means of one or more step-down controllers.

BACKGROUND OF THE INVENTION

Circuit arrangements for current regulation inside electronic brake controllers for motor vehicles are known which can be used to regulate the current from inductive loads, such as valve coils or pump motors. Since the power in a motor vehicle is normally provided from a battery, the current regulator needs to cover a relatively wide voltage range, depending on the nature of the battery. However, the voltage range of the load itself also needs to be designed such that the load still performs its intended function with a supply voltage at the lower end of the specified input voltage range. This sometimes results in design comprises which give rise to additional costs. The problem is aggravated in that the power supply path in automobile applications frequently requires a polarity reversal protection element, which, depending on the electronic design process, can bring about additional voltage losses, for example if a semiconductor diode arrangement is used for this purpose.

SUMMARY OF THE INVENTION

An object of the present invention is to further improve an inherently known circuit arrangement for actuating a load (load actuation circuit (see 602, FIG. 6)), particularly a load current regulator circuit, in a controller.

The invention achieves this object by means of the load actuation circuit that is described herein.

Load actuation is effected using one or more current regulators. The invention tackles the concept, inter alia, of regulating the input voltage (see 606, FIG. 6) for said load current regulator or the load current regulators or for the loads to an output voltage level (see 608, FIG. 6) which is at least below, and no more than equal to, the voltage level which corresponds to the present battery voltage under load. In the exemplary case where the controller (see 600, FIG. 6) is a brake controller, the actuated load may be a solenoid valve coil in a hydraulic valve, for example. If the solenoid valves based on the prior art are supplied with actuation more or less directly, that is to say without lowering the voltage using a step-down controller (see 604, FIG. 6), they need to be designed for a relatively high voltage range, depending on the battery type and specification of the vehicle. The use of a step-down controller allows the advantageous operation of the load in a smaller voltage range, which means that the design demands on the loads and hence frequently also the production costs are in many cases lower. The controller 600 may also be a chassis controller, an active/passive safety system, or combination of all three controllers.

The load actuation circuit preferably also comprises a polarity reversal protection circuit. In line with one particularly preferred embodiment of the invention, the controller comprises a polarity reversal protection circuit which can be controlled using one or more control elements. In this case, the polarity reversal protection circuit comprises at least one element which blocks at least in one current direction. The special feature of the particularly preferred circuit is that the control element(s) affecting the polarity reversal protection circuit can also be used for the operation of the step-down controller(s).

According to a further embodiment of the invention, the load actuation circuit comprises one or more DC/DC converters, which preferably use(s) a clocked stage to charge an energy store, particularly a coil or a capacitor.

Preferably, the clock actuation is effected as stipulated by the charge state of the energy store which is present in the step-down controller.

The clocking is modified preferably by customizing the actuation pattern of the active components actuated during clocking.

The invention also relates to a step-down controller according to aspects of the invention.

BRIEF DESCRIPTION OF THE DRAWINGS

The invention is best understood from the following detailed description when read in connection with the accompanying drawings. Included in the drawings is the following features.

DETAILED DESCRIPTION OF THE PREFERRED EMBODIMENTS

Figure 1:
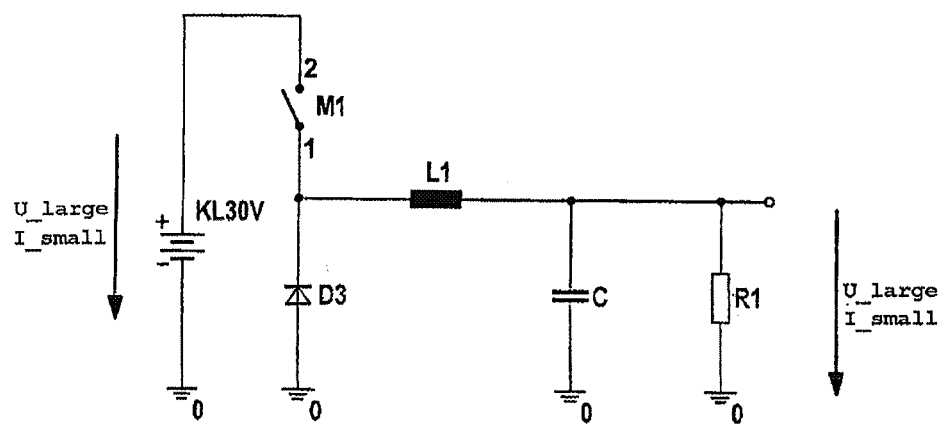
FIG. 1 shows a clocked step-down controller.

The step-down controller in FIG. 1 comprises a clocked DC/DC step-down converter with a coil L1 as an energy store. The clocking is performed using a semiconductor switch M1, which is switched on and switched off alternately. Switching off and switching on the switch and a suitable choice of switching frequency charge the coil L1 to a desired voltage. The coil is discharged through a connected load R1 when the switch M1 is off as a result of the coil L1 being discharged, with the current flowing via the diode D3. Arranged downstream of the coil, in parallel with the load, there is a capacitor C for smoothing the periodic coil current in a similar manner to a 2nd-order low-pass filter.

Figure 2:
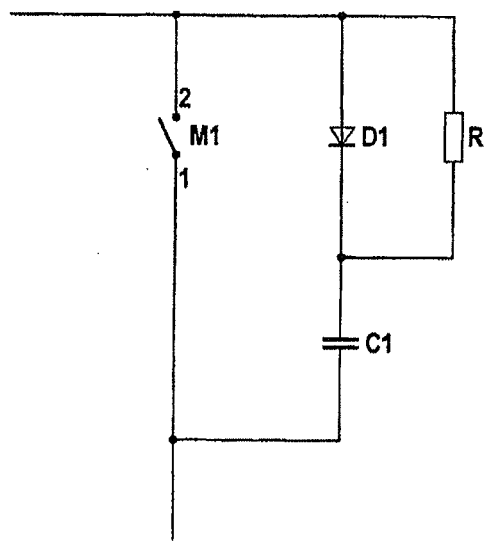
FIG. 2 shows a circuit for relieving the load on the switch in the step-down controller shown in FIG. 1.

The relief of switching load in FIG. 2 serves the purpose of reducing the power loss when the semiconductor switch M1 is switched off. To this end, there is a capacitor C1 in the path in parallel with the switch M1. In series with C1 there is a diode D1 which is biased in the direction of current flow of the power supply. Arranged in parallel with the diode D1 is a resistor R. A drawback of this circuit is that in the resistor R an undesired proportion of the power introduced into the circuit is converted into heat loss.

Figure 3:
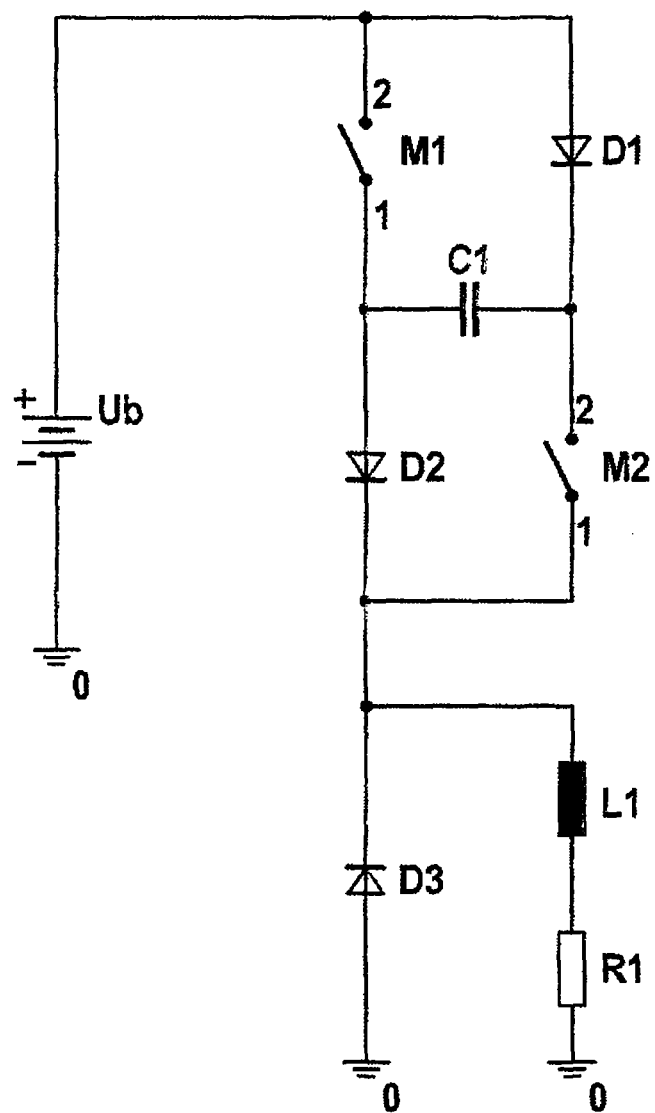
FIG. 3 shows an EMC optimized, low-loss step-down controller.

Apart from the resistor R, the step-down controller in FIG. 3 comprises the circuit elements from FIGS. 1 and 2, but extended by the semiconductor switch M2 and the diode D2. D2 is connected in series with the switch M1 in the direction of current flow of the supply. The cathode of the diode D2 is connected via the switch M2 to that terminal of the capacitor C1 which faces the cathode of the diode D1. The other terminal of the capacitor C1 is connected to the anode of the diode D2 and to the switch M1.

The circuit described above in FIG. 3 allows smoothed switching of the switch M1 and hence a considerable reduction in EMC stresses. In comparison with the circuit in FIG. 2, the losses are additionally distinctly reduced. The switch M2 is switched on when M1 is switched off, which means that the capacitor C1 charged in the preceding switching phase can be discharged again in the switched-off phase of M1, with the stored energy being output into the load circuit.

Figure 4A:
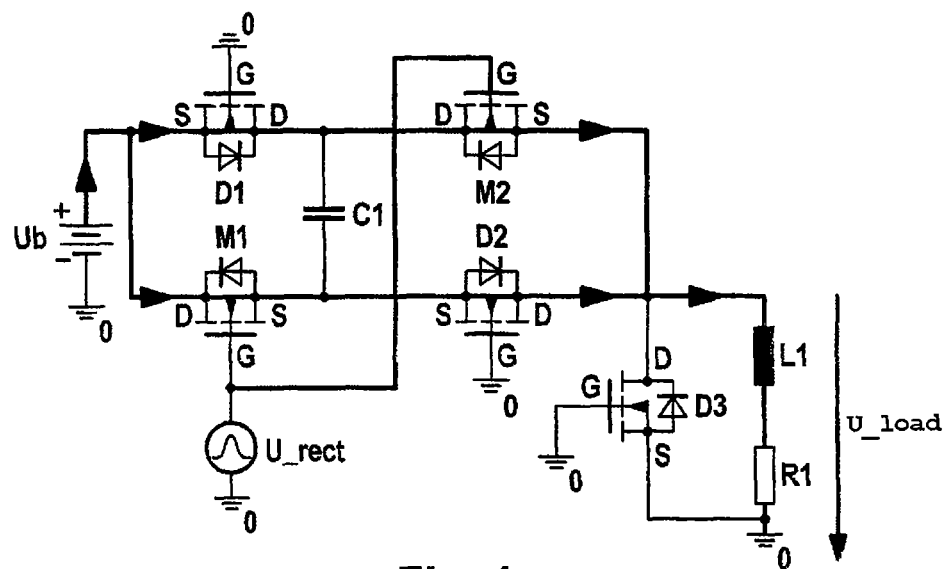
FIGS. 4*a*-4*d* show various switching phases for a circuit arrangement for a step-down controller which has been improved further in comparison with FIG. 3.
Figure 4B:
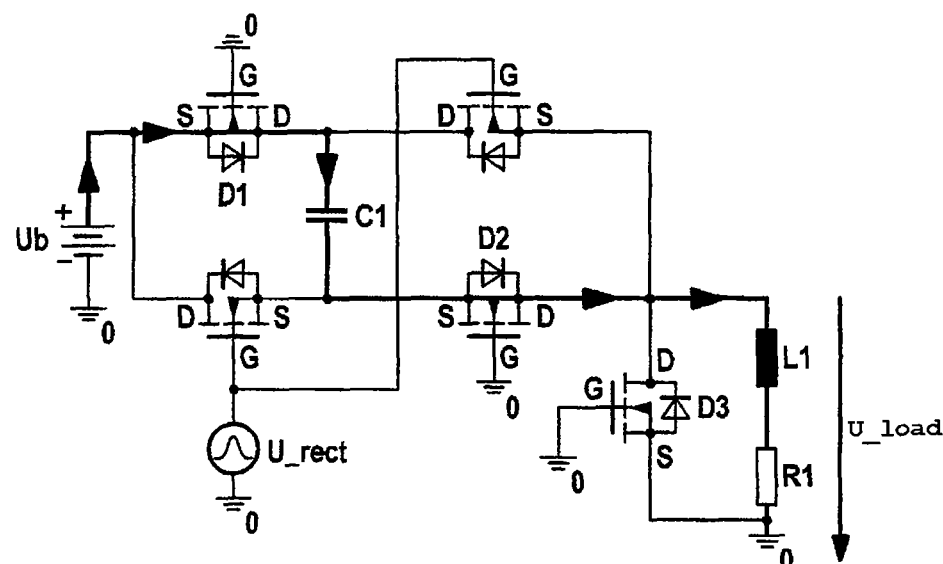
Figure 4C:
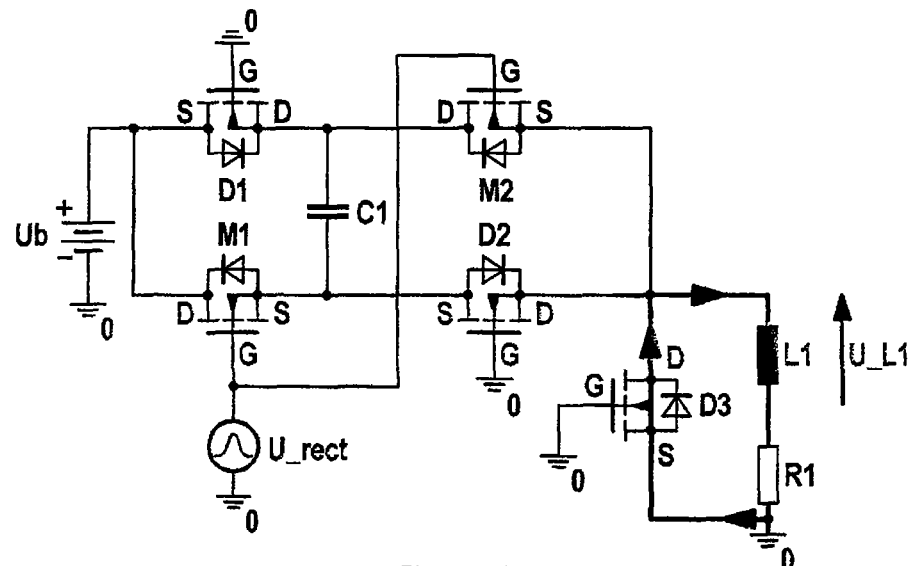
Figure 4D:
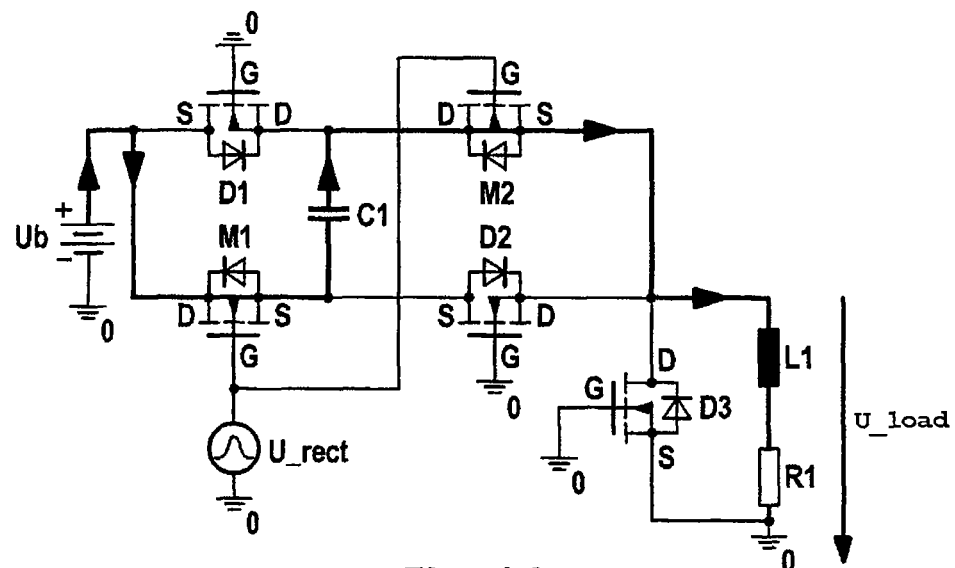

FIGS. 4a to 4d show various switching phases of a circuit arrangement which has been modified in comparison with FIG. 3, the diodes D1, D2 and D3 having been replaced by semiconductor switches (the symbols D1 and D2 continue to be used). The thicker lines provided with arrows symbolize the current-carrying lines in the respective switching phase. The symbols S, G and D denote the MOSFET connections Source, Gate and Drain. In FIG. 4a, the switches M1 and M2 are switched on (switching state A). The Gate voltages for the MOSFETs M1 and M2 are produced by the voltage generator U_rect. The Gates of the switches D1, D2 and D3 are connected to the reference-ground potential (GND or "0"). The switches D1 and D2 are switched on. The switch D3, which is in parallel with the load, is switched off. The current flows from the battery Ub via the switches M1 and M2 and also the diodes D1 and D2 into the load R1, L1. In FIG. 4b, the switches M1 and M2 are switched off. The switches D1 and D2 are switched on. The switch D3 is switched off (switching state B). During switching state B, the capacitor C1 is charged. In FIG. 4c, the switches M1 and M2 and also D1 and D2 are switched off. The switch D3 is switched on, which means that a recirculation current can flow through the load (switching stage C). In FIG. 4d, the switches M1 and M2 are switched on. The switches D1, D2 and D3 are switched off (switching state D). In this switching phase, the current flows from the battery Ub via the switches M1, M2 and the capacitor C1 into the load.

In addition to the variant illustrated here, it is also possible to regulate loads with an overlaid voltage source (e.g. EMS in the case of a DC motor) using a separate inductive (real) load (able to be equivalently represented in simplified form as an inductance L1 and an internal resistance R1).

For particular demands, it may be expedient to smooth the regulated voltage U_load using a capacitive element, for example in parallel with R1.

It may also be expedient to use the energy stored in the capacitor C1 in another load. A combination of a plurality of the step-down controllers defined above is a further preferred embodiment of the invention. It makes sense, in one specific implementation, to take the load as a basis for choosing the capacitance of C1 in a suitable manner depending on the requirement. It is alternatively possible to use FETs or bipolar transistors as MOSFETs. The circuit group containing the components M1, M2, D1, D2 and C1 can be operated either at positive, negative or at reference-ground potential (GND). The circuit group mentioned above can also be used to represent other EMC-optimized circuits with recovery of the buffered energy, such as in a step-up controller, in which the assembly described is used to charge the inductance specific to the step-up controller. The circuit may be of discrete or integrated design. The circuit can also be used in AC voltage networks if a rectifier is connected upstream.

Figure 5:
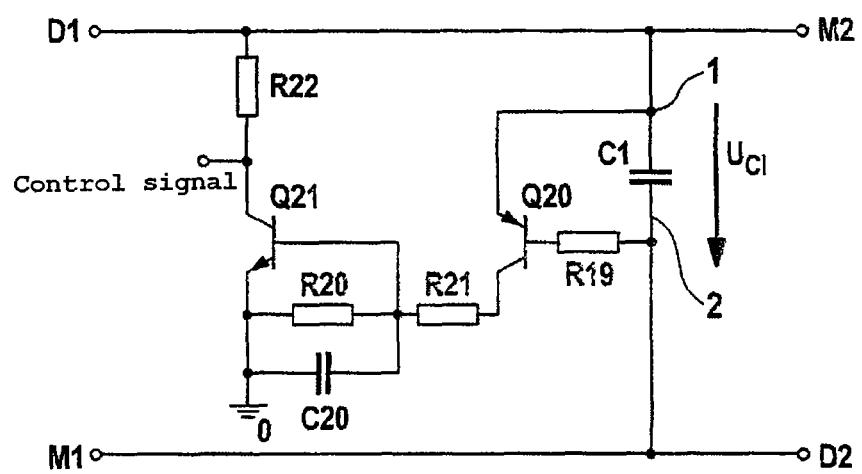
FIG. 5 shows a charge state measurement circuit.
Figure 6:
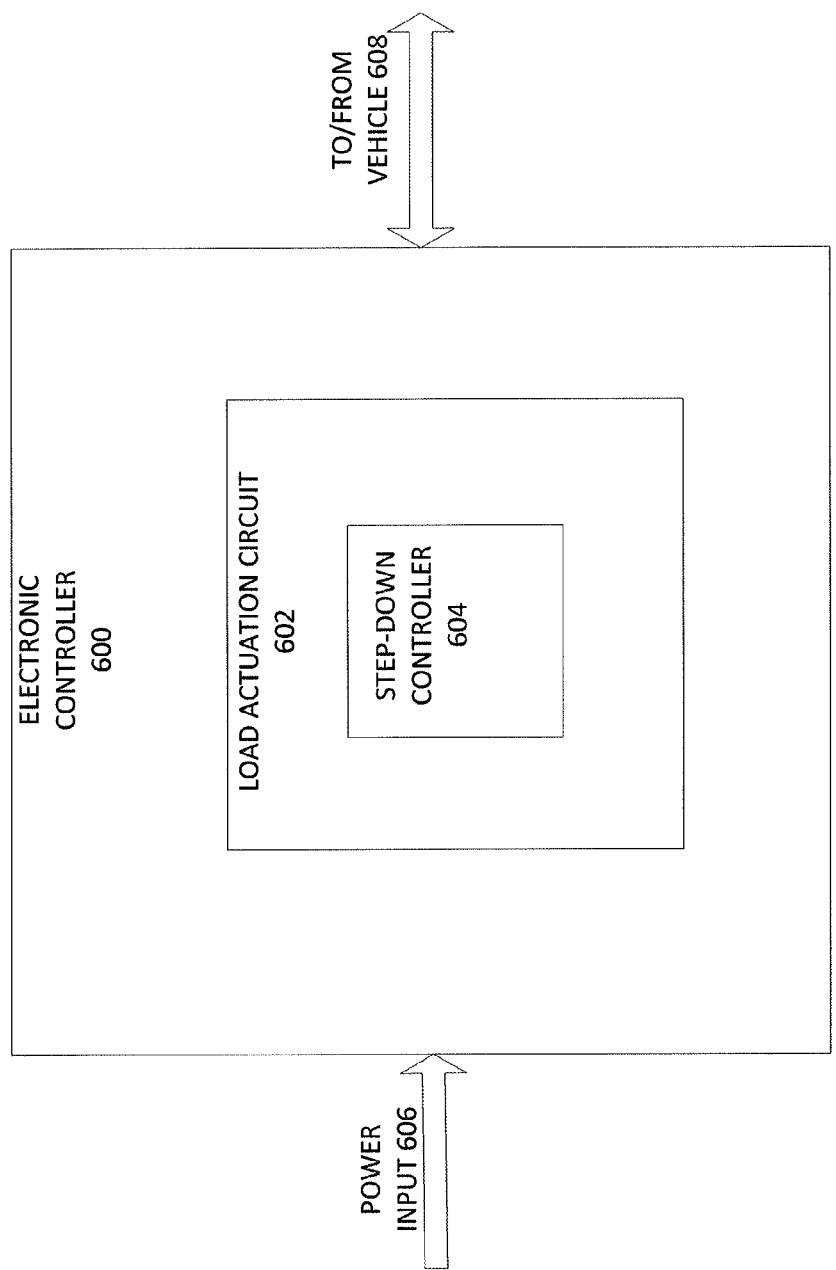
FIG. 6 shows a block diagram of an Electronic Brake Controller with inputs and outputs.

By way of example, the charge state measurement circuit in FIG. 5 can be used to determine the charge state of the capacitor C1 in the circuits shown in FIGS. 3 and 4. The circuit comprises a transistor Q20, the base of which is connected via the resistor R19 to a first terminal 1 of the capacitor C1 (energy store of the DC/DC converter in FIGS. 3 and 4). The emitter of the transistor Q20 is connected to the other terminal 2 of the capacitor C1. The collector of the transistor Q20 is routed via the resistor R21 to the base of the transistor Q21 and the capacitor C20. The emitter of the transistor Q21 is routed to a ground connection, as is the other terminal of the capacitor C20. Arranged in parallel with the capacitor C20 is a resistor R20. The collector of the transistor Q21 forms the control signal for the clock actuation. This connection is connected to the first terminal 1 of the capacitor C1 via the resistor R22.

So long as the capacitor C1 has a positive charge (voltage on the first terminal 1 higher than on the second terminal 2, and difference greater than the base/emitter voltage of the transistor Q20), the transistor Q20 is on. The transistor Q21 provides for customization of the signal to a logic level. The resistors R21, R20 and the capacitor C20 allow customization of the delay, so that the switching times of different FET types can be taken into account. Optimum actuation of the switches MD1, MD2 and also D1 and D2 in FIGS. 3 and 4 is achieved precisely when the time of the actuation with a capacitor voltage has fallen to a value close to 0 V (capacitor completely discharged). If there are discrepancies in the actuation time towards delayed actuation, pulsating undesirable short-circuit or circulating currents arise for a switch connected via the to the capacitor. If the semiconductor switches are actuated too early, only the internal resistance is increased for the switching elements D1 and D2 which are in diode mode, as a result of which losses arise. Overall, a suitable choice of actuation time on the basis of the charge state of the capacitor C1 therefore allows the power loss to be reduced and the EMC characteristic of the circuit to be improved further still.

The invention claimed is:

1. A load actuation circuit in an electronic motor vehicle including:
   a step-down controller including:
      a first semiconductor switch having a first control terminal;
      a second semiconductor switch having a second control terminal;
      a third semiconductor switch configured as a polarity reversal protection device, and having a third control terminal;
      a fourth semiconductor switch configured as a polarity reversal protection device, having a fourth control terminal; and
      a capacitor connected to the first, second, third and fourth semiconductor switches;
   wherein: 1) the respective control terminals of the first and second semiconductor switches are connected to a common control source, 2) the respective control terminals of the third and fourth semiconductor switches are connected to a common reference potential, and 3) the step-down controller is connected to a load and delivers electric current to the load.

2. The load actuation circuit as claimed in claim 1, wherein the third semiconductor switch and the fourth semiconductor switch are configured to block electrical current in at least one current direction.

3. The load actuation circuit as claimed in claim 2, wherein the third and fourth semiconductor switches are configured to be bypassed using the first and second semiconductor switches when the first and second semiconductor switches are switched on,
wherein at least some or all semiconductor switches used for bypassing provide for clocking of the step-down controller.

4. The load actuation circuit as claimed in claim 2, wherein the third and fourth semiconductor switches are configured to be bypassed using the first and second semiconductor switches when the first and second semiconductor switches are switched on,
wherein at least some or all semiconductor switches used for bypassing provide for clocking of the step-down controller simultaneously.

5. The load actuation circuit as claimed in claim 1, wherein the step-down controller comprises one or more direct current to direct current (DC/DC) converters which use(s) a clocked stage to charge a coil or a capacitor.

6. The load actuation circuit as claimed in claim 1, wherein the third semiconductor switch is connected to the capacitor, so that the capacitor is charged when the third semiconductor switch is switched off, and the capacitor can be discharged via the fourth semiconductor switch, when the fourth semiconductor switch is switched on and the third semiconductor switch is switched off, via the load or via another load.

7. The load actuation circuit as claimed in claim 1, wherein the step-down controller performs at least one of clearing of interference from and smoothing the converted voltage.

8. The load actuation circuit as claimed in claim 1, wherein a duration of at least one of the switched-on phase and the switched-off phase of the third semiconductor switch and the fourth semiconductor switch is dependent on a voltage forwarded to the load or on the current.

9. The load actuation circuit as claimed in claim 1, wherein the load is an inductive load and an actuation path for the load contains no inductance for storing energy.

10. The load actuation circuit as claimed in claim 1, wherein the loads comprise at least one of valve coils and motors which are designed for a voltage range from approximately 6 Volts to approximately 12 Volts.

11. The load actuation circuit as claimed in claim 1, wherein the controller is a brake controller or a chassis controller or a controller for active or passive safety systems or a combination of these controllers.

12. The load actuation circuit as claimed in claim 1, wherein clocking of the step-down controller is controlled by a measurement using a charge state measurement circuit,
wherein the charge state measurement determines the charge state of the capacitor, and
wherein the charge state measurement circuit includes transistors.

* * * * *